(No Model.)
J. EDWARDS & L. ELLIOTT.
COFFEE POT.
No. 364,911. Patented June 14, 1887.
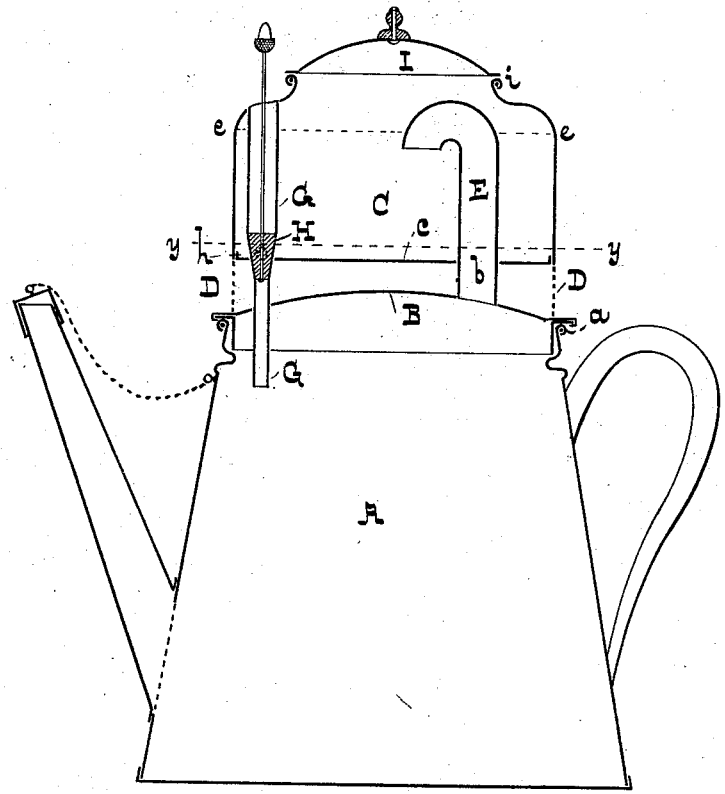
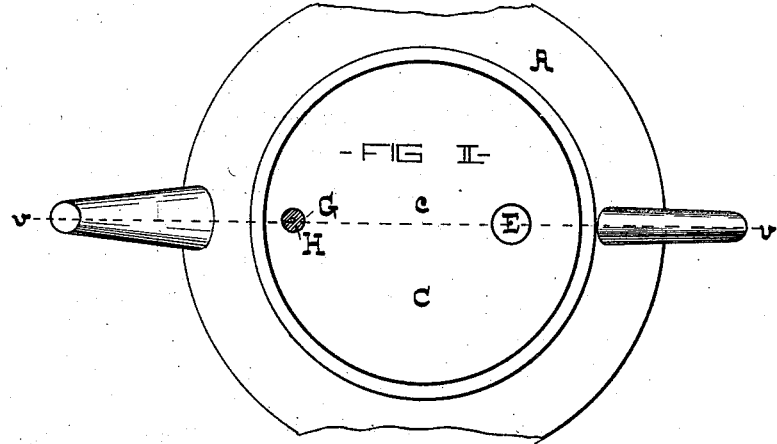
WITNESSES
Dan'l Fisher
E. Cruse
INVENTORS
James Edwards,
Louis Elliott,
by G.H.&W.T.Howard, atty.
N. PETERS, Photo-Lithographer, Washington, D. C.

United States Patent Office.

JAMES EDWARDS AND LOUIS ELLIOTT, OF BALTIMORE, MARYLAND.

COFFEE-POT.

SPECIFICATION forming part of Letters Patent No. 364,911, dated June 14, 1887.

Application filed February 16, 1887. Serial No. 227,809. (No model.)

*To all whom it may concern:*

Be it known that we, JAMES EDWARDS and LOUIS ELLIOTT, both of the city of Baltimore, and State of Maryland, have invented certain Improvements in Coffee-Pots, of which the following is a specification.

Figure I is a sectional elevation of the improved coffee-pot, taken on the dotted line $v\ v$, Fig. II. Fig. II is a cross section of the coffee-pot, taken on the dotted line $y\ y$, Fig. I.

Similar letters of reference indicate similar parts in both the figures.

A is the body of the coffee-pot, into which the ground coffee and water are placed, and B the lid, hinged to the body at $a$.

C is a condensing-chamber separated from the lid B by means of an annular sheet of perforated tin-plate or wire-work, D. Cold water is poured into the chamber until it reaches the line hereinafter referred to as the water-line.

The object in separating the chamber from the body of the coffee-pot is to prevent heat being communicated to the condensing-water except by the means of steam, as hereinafter described.

E is a siphonic pipe, the long leg $b$ of which extends through the bottom $c$ of the condensing-chamber C, and is attached to the lid B. The short leg of the siphon E terminates slightly below the water-line $e$ in the condensing-chamber.

It will be seen that the interior of the body of the coffee-pot is, under all circumstances, in communication with the interior of the condensing-chamber by means of the siphon E. Consequently all steam and aroma driven from the water in the body of the coffee-pot are conducted to the water in the condensing-chamber, where it is condensed and retained in a proper condition to be returned to the water in the body after the coffee has been sufficiently boiled.

To admit of the return of the condensed steam and aroma to the water in the body of the coffee-pot, we provide the condensing-chamber with a pipe, G, which projects through the lid B, and place in the said pipe a valve, H, of hard rubber or some other suitable material, which has a handle, whereby it may be opened from the top of the condensing-chamber, as shown in the drawings. An aperture, $h$, in the side of the pipe G admits of the return of the contents of the condensing-chamber to the body of the coffee-pot when the valve H is raised. The condensing-chamber has a cover, I, which is hinged at $i$ to the inwardly-flared edge of the same. (See Fig. I.)

To make coffee by means of our improved coffee pot, the dry ground coffee is placed in the body of the pot and a sufficiency of water added. The condensing-chamber is then supplied with cold water up to the water-line $e$, the valve H being of course closed. When the water in the body begins to boil, the aroma and steam are carried through the siphon-pipe E to the cold water in the condensing-chamber and condensed and retained. The boiling is continued until the full strength of the coffee is extracted, after which the valve is withdrawn or lifted from its face, which allows the water in the condensing-chamber, which contains the aroma driven off in the boiling operation, to return to the body of the coffee-pot.

We claim as our invention—

In a coffee-pot, the body thereof having a condensing-chamber situated over it, combined with a siphon to connect the said parts, and a pipe having a valve whereby the contents of the condensing-chamber can be transferred to the body of the coffee-pot, substantially as and for the purpose specified.

JAMES EDWARDS.
LOUIS ELLIOTT.

Witnesses:
WM. S. HOWARD,
E. CRUSE.